(12) United States Patent
Ho et al.

(10) Patent No.: US 7,777,944 B2
(45) Date of Patent: Aug. 17, 2010

(54) REFLECTIVE SCREENS

(75) Inventors: Fang-Chuan Ho, Taoyuan Hsien (TW); June-Jei Huang, Taoyuan Hsien (TW); Kun-Hung Tu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 553 days.

(21) Appl. No.: 11/713,704

(22) Filed: Mar. 5, 2007

(65) Prior Publication Data
US 2007/0285786 A1 Dec. 13, 2007

(30) Foreign Application Priority Data
Jun. 8, 2006 (TW) .............................. 95120367 A (51) Int. Cl.
*G03B 9/08* (2006.01)
(52) U.S. Cl. ....................................... 359/443; 359/459
(58) Field of Classification Search ................. 359/449, 359/443, 359
See application file for complete search history.

(56) References Cited

U.S. PATENT DOCUMENTS

| | | | |
|---|---|---|---|
| 5,335,022 A | 8/1994 | Braun et al. | |
| 5,456,967 A * | 10/1995 | Nezu | 428/141 |
| 5,625,489 A | 4/1997 | Glenn | |
| 6,542,302 B2 * | 4/2003 | Cross | 359/581 |
| 6,961,175 B2 * | 11/2005 | Toda et al. | 359/452 |
| 6,987,610 B2 | 1/2006 | Piehl | |
| 2003/0086160 A1 * | 5/2003 | Knapp | 359/361 |
| 2004/0150883 A1 * | 8/2004 | Shimoda et al. | 359/443 |
| 2004/0233524 A1 * | 11/2004 | Lippey et al. | 359/443 |
| 2004/0240053 A1 * | 12/2004 | Shimoda | 359/449 |
| 2005/0180002 A1 * | 8/2005 | Ohsako et al. | 359/449 |
| 2005/0207007 A1 * | 9/2005 | Shimoda et al. | 359/449 |
| 2005/0264874 A1 * | 12/2005 | Lin | 359/359 |
| 2006/0001959 A1 * | 1/2006 | Senoue et al. | 359/449 |

* cited by examiner

*Primary Examiner*—Clayton E. LaBalle
*Assistant Examiner*—Leon W Rhodes
(74) *Attorney, Agent, or Firm*—Birch, Stewart, Kolasch & Birch, LLP (57) ABSTRACT

This invention discloses a projection screen including a diffusion layer, a cap layer, an interference layer and an absorption layer. The projection screen of this invention is based on the concept of inverse reflection. The interference filter includes a plurality of high and low refractive index layers, both of which alternately stacked. The projection screen conveys a small spectral shift and a narrow bandwidth at different incident angles so that the better contract ratio of the image signal can be displayed.

14 Claims, 11 Drawing Sheets

REFLECTIVE SCREENS

BACKGROUND OF THE INVENTION

1. Field of the Invention

The invention relates to a reflective screen for projectors, and more particularly to a reflective screen capable of increasing image contrast.

2. Description of the Related Art

A front projection display, referred to as a projector, typically uses a reflective screen to display images. Image signals projected on and reflected by the reflective screen are seen by viewers as images. Conventional reflective screens typically comprise flexible material, thus, they are easily rolled up for storage. Reflective screens, however, have same drawbacks, such as reduced image contrast due to reflected environmental light.

Recent improvements in reflective screens include increased image contrast in bright environmental light, increasing flexibility and durability, and reduced fabrication costs.

U.S. Pat. No. 5,335,022 discloses a screen with a high image contrast. The screen selects polarized optical signals from a projector but not environmental light to increase the image contrast. A polarizing filter layer is adhered to the screen, thus, passage of optical signals from the projector and the optical signals parallel to the polarizing filter layer is allowed. Polarized environmental light vertical to the polarizing filter layer is, however, filtered. Environmental light must be polarized prior to increasing the image contrast of the screen, thus, the screen is less workable.

U.S. Pat. No. 5,625,489 discloses a combination screen comprising one reflective layer and three polarization controlling layers. The polarization controlling layer has biconvex lens disposed between a photosensitive polarization film and a ¼ wave plate. Since optical signals from a projector are focused and reflected through the lens, the photosensitive polarization film can be activated to allow passage of light. When incident, half of the environmental light is blocked by the photosensitive polarization film. The other half of the light is reflected from the reflective layer after passing through the ¼ wave plate, and then passes again through the ¼ wave plate. Thus, the photosensitive polarization film blocks the other half of the light. The screen of this invention is relatively less flexible.

U.S. Pat. No. 6,987,610 discloses a screen for front projection displays sequentially comprising a substrate, an absorbing material and an uppermost luminescent material. Image signals from a projector excite the luminescent material simultaneously emitting image signals from the projector. The absorbing material absorbs all environmental light except for light of three primary colors (red, green and blue), thus the image contrast of the screen increases.

Figure 1A:
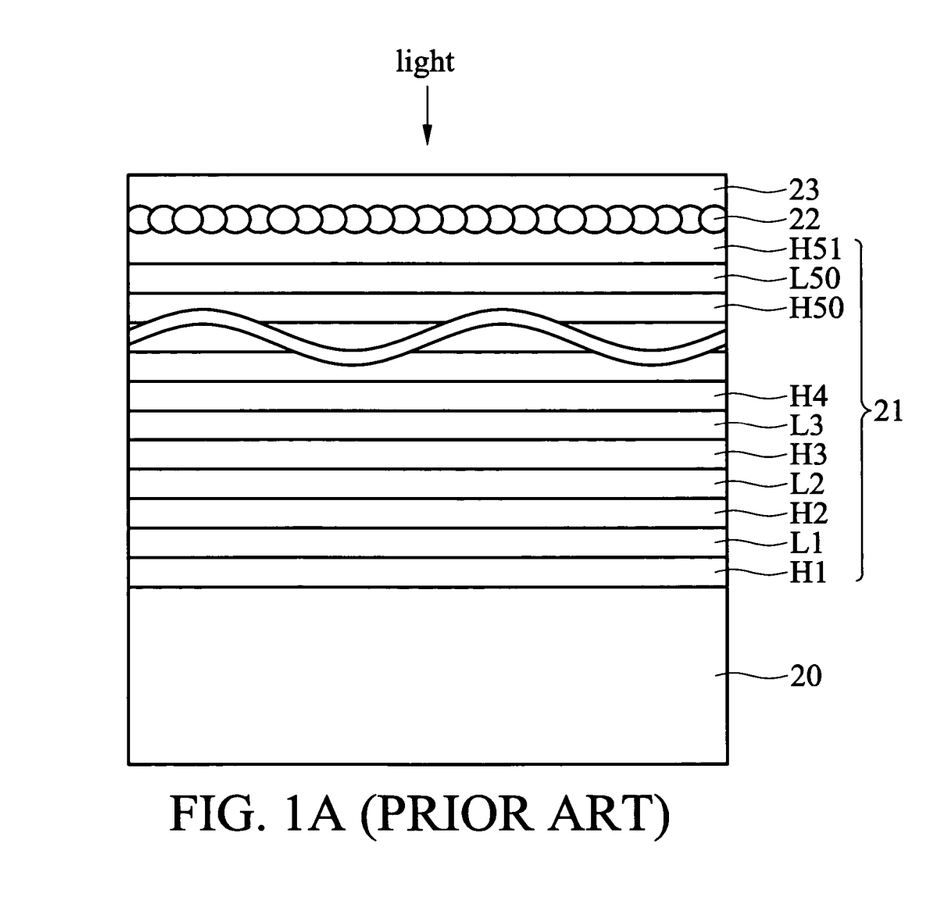
FIG. 1A shows cross section of a conventional reflective screen.
Figure 1B:
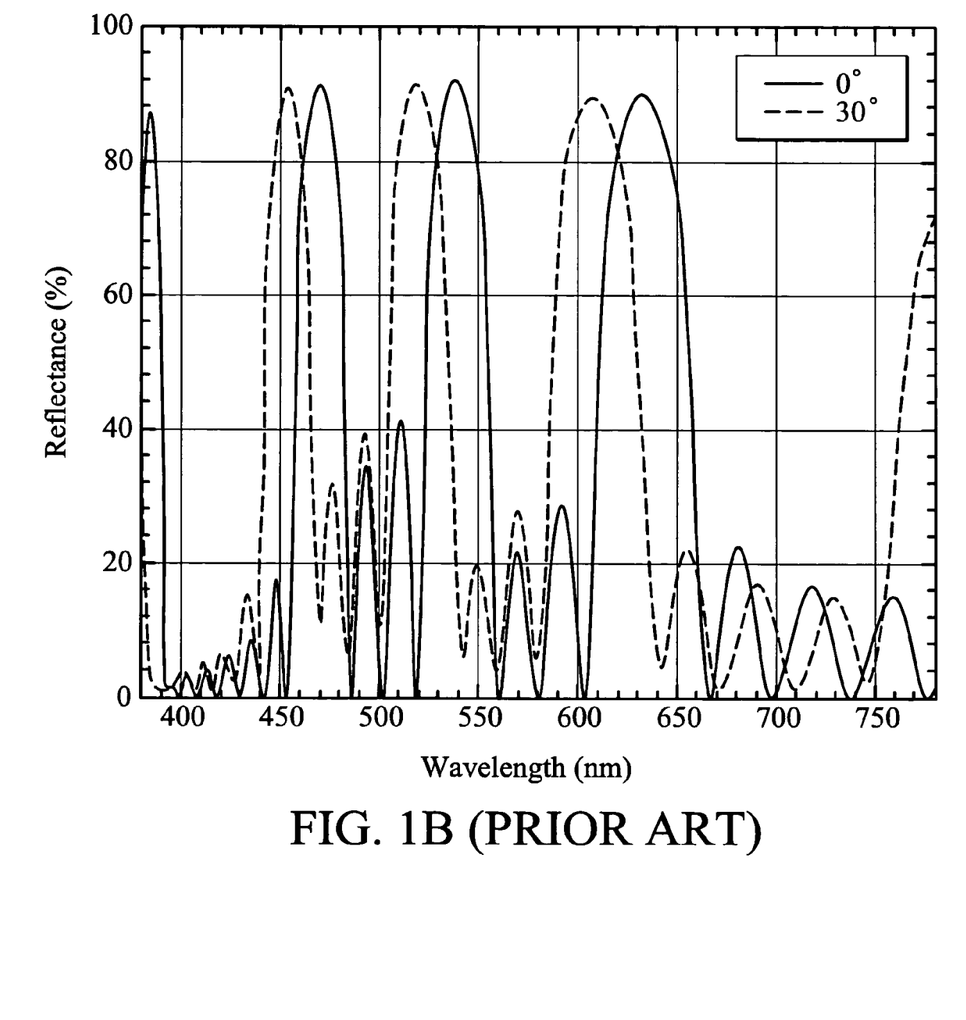
FIG. 1B shows a shift of spectral reflectance of the optical film when the incident angles of light are 0° and 30° respectively according to FIG. 1A.

US patent publication No. 2004/0150883 discloses a screen for a projector having high image contrast and excellent flexibility. Fabrication of the screen is inexpensive and easily to be carried. As shown in FIG. 1A, the screen includes a substrate 20 capable of absorbing light, an optical film 21, a diffusion layer 22 and a protection layer 23. The optical layer 21 comprises layers of high refractive index material H1-H51 and low refractive index material L1-L51. The optical layer 21 does not absorb light, and intensely reflects the light of three-primary colors. Since image signals from the projector consist of three-primary colors, the screen is able to reflect the image signals. FIG. 1B shows a shift of the spectral reflectance of the optical film when the incident angles of light are 0° and 30°.

Figure 2A:
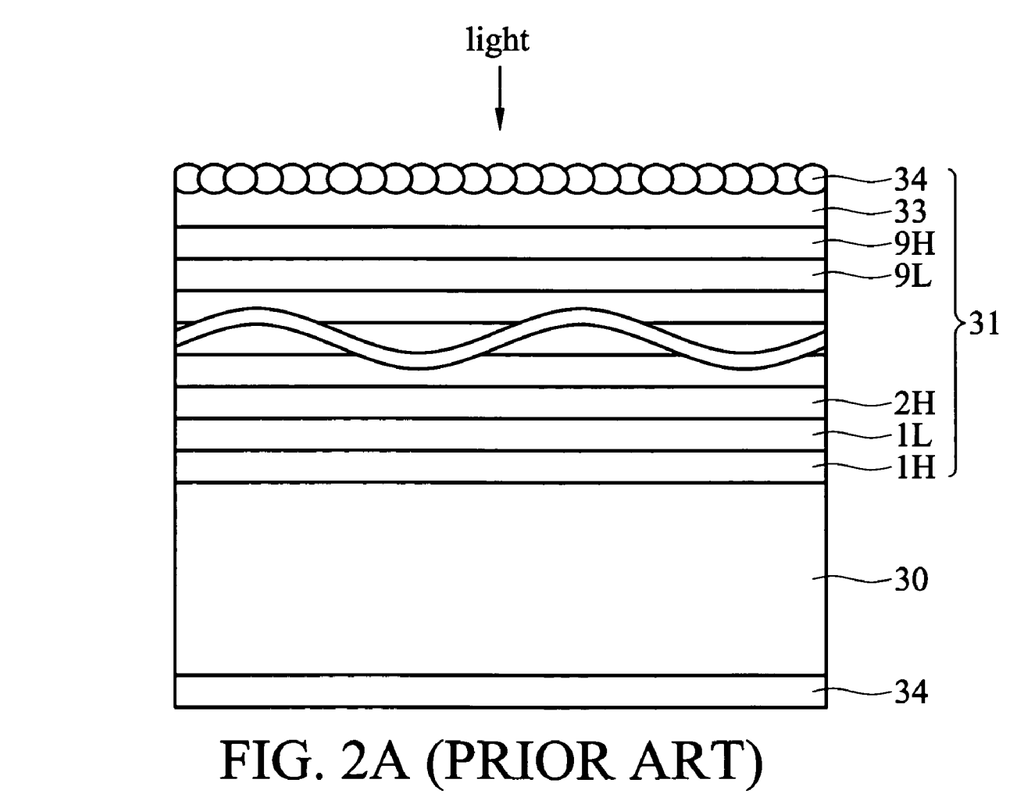
FIG. 2A shows cross section of another conventional reflective screen.
Figure 2B:
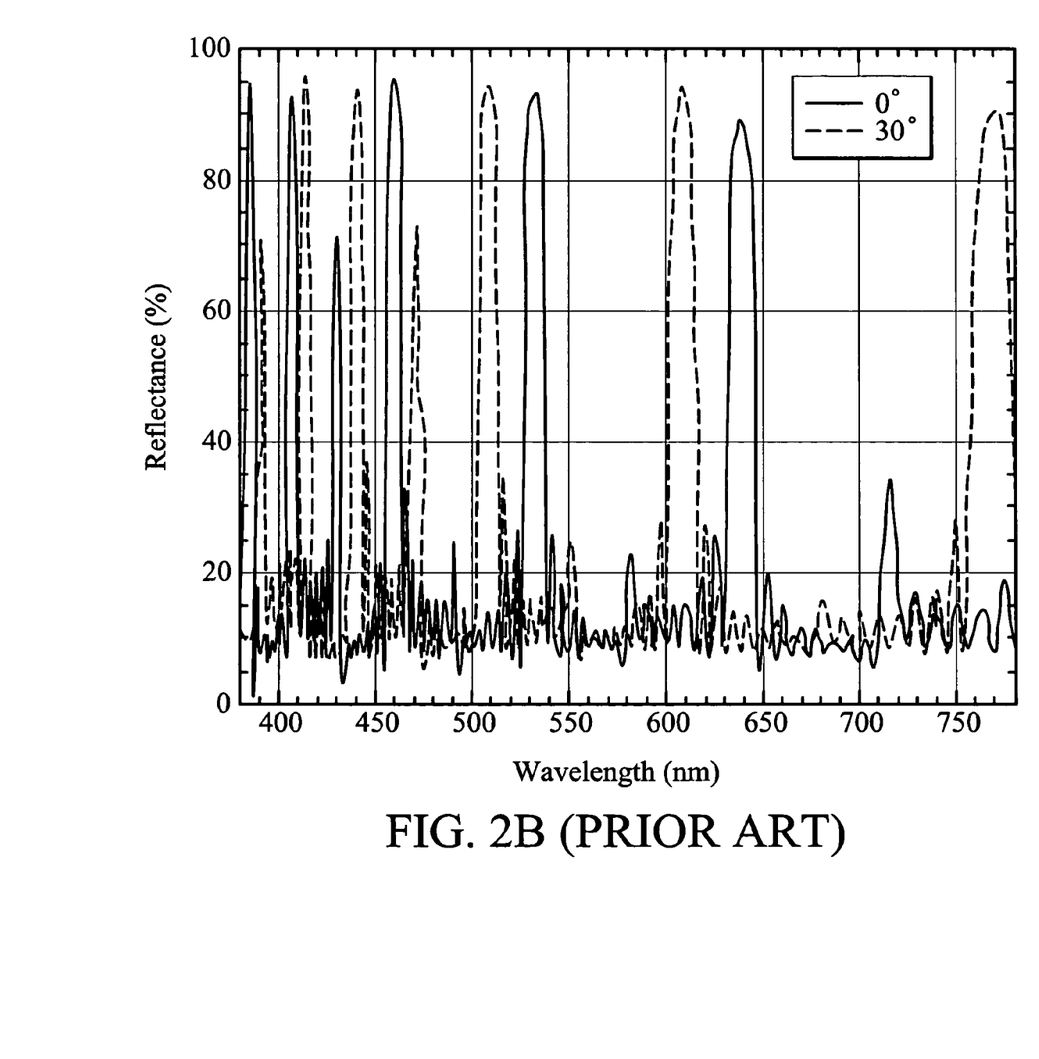
FIG. 2B shows a shift of spectral reflectance of the optical film when the incident angles of light are 0° and 30° respectively according to FIG. 2A.

US patent publication No. 2004/0240053 discloses a reflective screen having an optical film. The screen is made of polymer material with solvent. As shown in FIG. 2A, the screen comprises a light absorption layer 34, a transparent substrate 30, a stacked optical film 31, an angle calibrating layer 33 and a diffusion layer 34. The stacked optical film 31 comprises alternate layers of high refractive index material 1H-9H and low refractive index material 1L-9L. FIG. 2B shows a reflection spectrum of the optical film when the incident angles of light are 0° and 30°.

Although the above-mentioned conventional reflective screens may increase image and color contrast, they still suffer from some drawbacks in system and structure. A novel reflective screen capable of increasing image contrast in bright environmental light with lower fabrication cost is thus desirable.

BRIEF SUMMARY OF THE INVENTION

A reflective screen is provided. An embodiment of a reflective screen comprises an absorption layer. An interference filter is formed on the absorption layer to reflect light and generate a shift in a spectrum when an incident light is introduced. A cap layer is formed on the interference filter. A diffusion layer is formed on the cap layer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
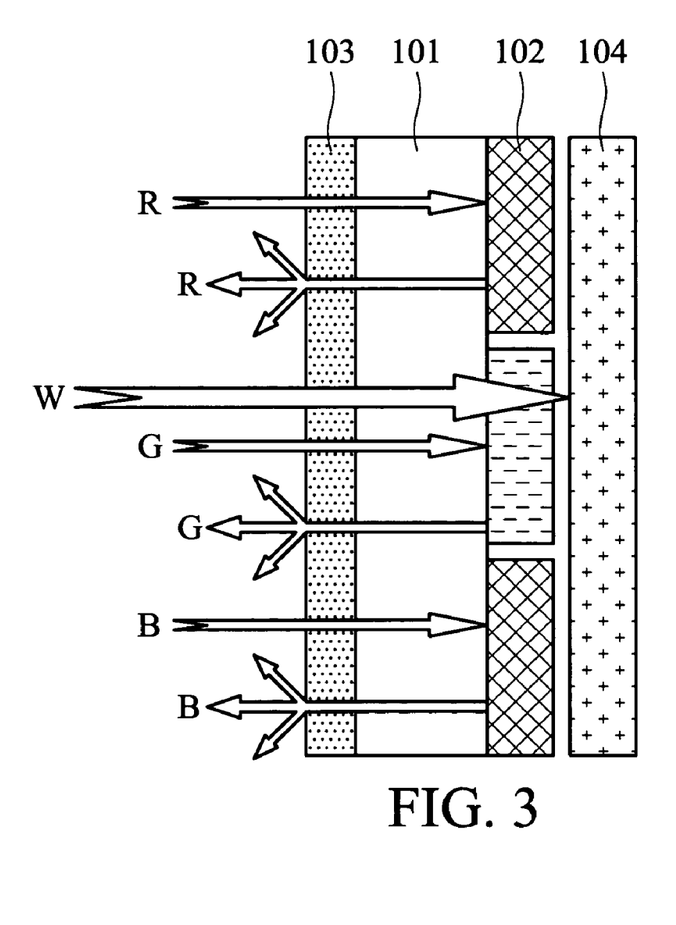
FIG. 3 shows a schematic view showing a reflective screen according to an embodiment of the invention.

FIG. 3 is a schematic view showing a reflective screen according to an embodiment of the invention. Referring to FIG. 3, a reflective screen according to an embodiment of the invention comprises a diffusion layer 103, a cap layer 101, an interference filter 102 and an absorption layer 104 which are sequentially disposed (on the cap layer 101) along the incident direction of light. Image signals projected on the reflective screen consist of the three primary colors, i.e. red (R), green (G) and blue (B). In addition to the image signals, white environmental light (W) is projected on the reflective screen. The interference filter 102 includes alternate layers of high refractive index layers and low refractive index layers. The interference filter 102 reflects light of specific wavelengths and therefore the reflective screen reflects light of the three primary colors while a portion of the environmental light not reflected by the interference filter 102 passes through the interference filter 102 and absorbs by the absorption layer 104.

Assuming image quality is equal to the ration of "signal intensity/non-signal intensity" and includes chroma and contrast. For image signals from a projector of 1000 Lumen, the environmental light of 100 Lumen, and the three primary colors which constitute white light to be equal in illumination, image quality of a conventional reflective screen is:

(1000/3+100/3)/(100×2/3)=5.5

In a preferred embodiment of the invention, half the light is, however, preferably reflected by the interference filter 102 while the other half of the light passes through the interference filter 102. Since a ratio of a reflective illumination of the interference filter 102 is about 0.5, image quality of the reflective screen according to an embodiment of the invention is:

(1000/3+0.5×100/3)/(0.5×100×2/3)=10.6

Therefore, image quality of the reflective screen according to this embodiment is substantially twice as that of a conventional reflective screen.

The interference filter 102 is provided with a narrower spectral bandwidth, that is, the interference filter 102 has high selectivity with respect to light of various wavelengths. When an LED or laser is used as a light source of a projector and a ratio of a reflective illumination of the interference filter 102 is about 0.1, image quality of the reflective screen is substantially tenfold in comparison with that of the conventional reflective screen. The interference filter 102 is disposed behind the cap layer 101 along the incident direction of light and therefore image signals from the projector enter the reflective screen through the diffusion layer 103.

Figure 4A:
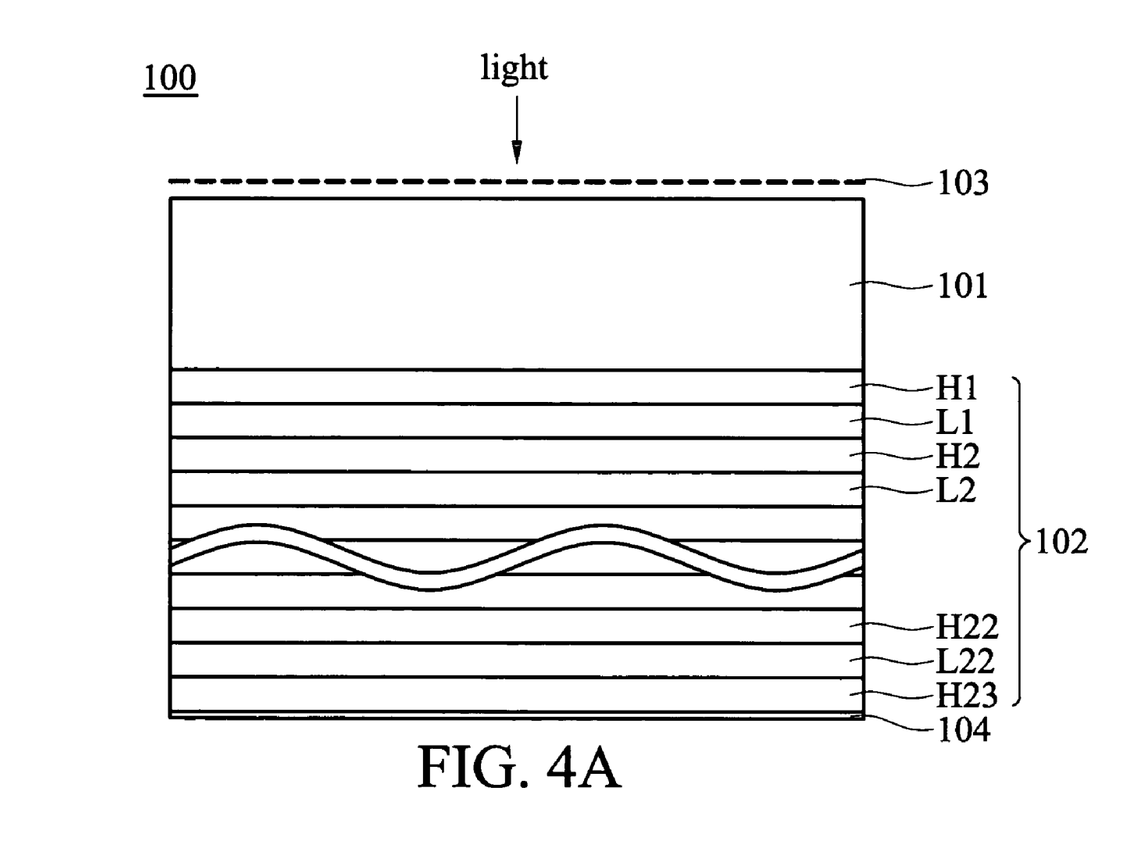
FIG. 4A shows cross section of a reflective screen according to another embodiment of the invention.

FIG. 4A is cross section of a reflective screen according to an embodiment of the invention. Referring to FIG. 4, a reflective screen 100 comprises a diffusion layer 103, a cap layer 101, an interference filter 102 and an absorption layer 104 which are sequentially disposed along the incident direction of light (on the top of the cap layer 101). The interference filter 102 comprises alternate layers of a plurality of high refractive index layers H1-H23 and a plurality of low refractive index layers L1-L22. In one embodiment of the invention, the cap layer 101 can be consisted of solid transparent material. The interference filter 102 is disposed on a rear surface of the cap layer 101, and the diffusion layer 103 is disposed on a front surface of the cap layer 101 facing toward environmental light and image signals from a projector. The absorption layer 104, comprising black or dark color pigments, is disposed behind (on the top of) the interference filter 102. The absorption layer 104 is used to absorb light passing through the interference filter 102 to prevent the light from being reflected again.

The high or low refractive index described in the invention is not limited to a specific range of refractive indexes, while the high or low refractive index is relative with respect to each layer.

The cap layer 101 has a refractive index of greater than about 1.4 and is consisted of polyethylene terephthalate (PET), poly carbonate (PC), poly (methyl methacrylate) (PMMA), combinations thereof or other likes.

The interference filter 102 comprises alternate high refractive index layers and low refractive index layers stacked on the cap layer 101. For flexibility, a total number of the high and low refractive index layers is less than 60. In one embodiment of the invention, the interference filter 102 is constituted by alternate stacked layers of 23 layers of $ZrO_2$ as the high refractive index layers and 22 layers of $Al_2O_3$ as the low refractive index layers, wherein the $ZrO_2$ and $Al_2O_3$ has a refractive index of about 2.05 and 1.62 respectively.

Figure 4B:
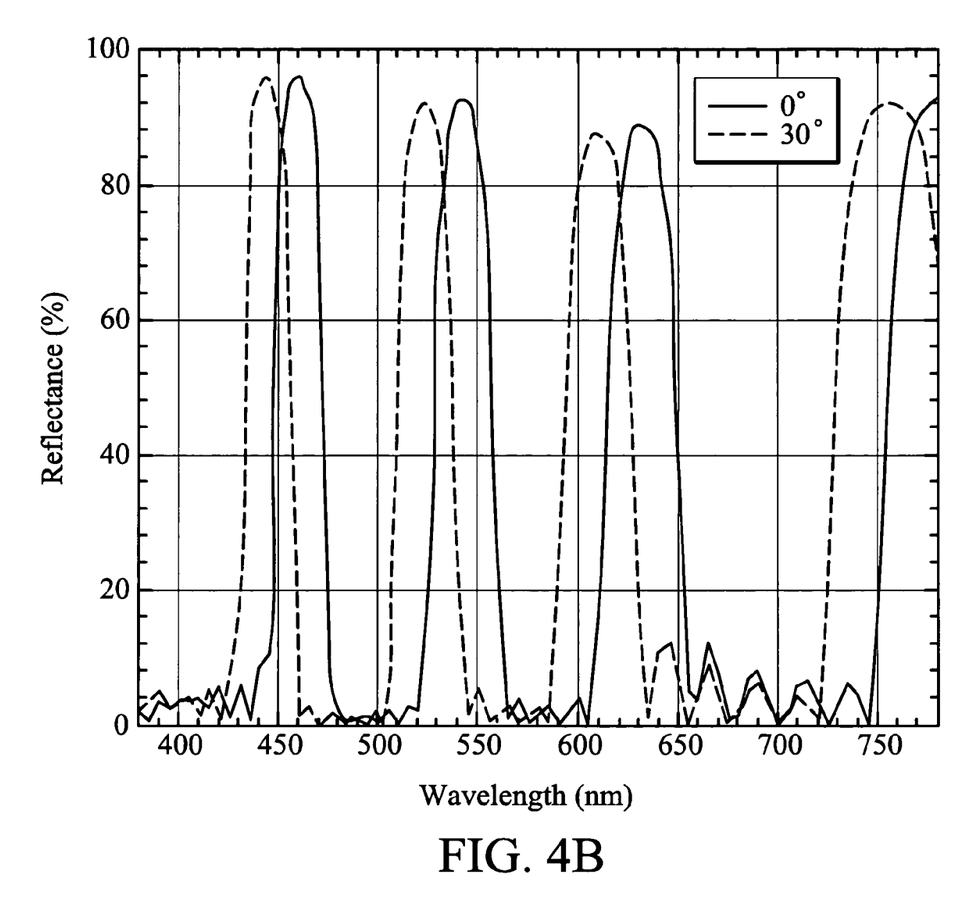
FIG. 4B shows a shift of spectral reflectance of the interference filter 102 according to FIG. 4A.

FIG. 4B is showing a spectral reflectance of the interference filter 102 according to an embodiment of the invention. Referring to FIG. 4B, when an incident angle of light is 0° and 30°, a shift in the spectral reflectance of the red, green and blue light is about 22 nm, 19 nm and 16 nm respectively. The average shift in spectral reflectance is less than about 0.66 nm/degree.

Figure 5:
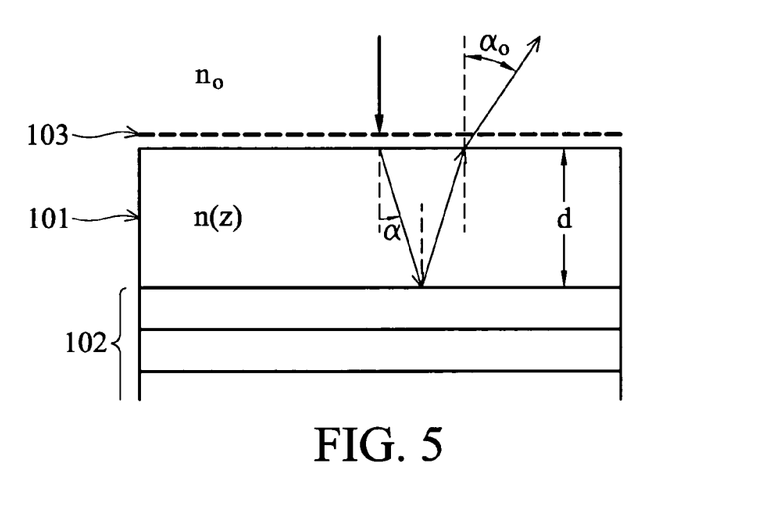
FIG. 5 shows a schematic view showing a reflective screen according to an embodiment of the invention.

The cap layer 101 is preferably used as waveguide interface for projected or environmental light. Referring to FIG. 5, the refractive index n(z) of the cap layer 101, having a thickness of "d", is greater than the refractive index no of an incident medium which is typically air. Light from outside the reflective screen is scattered by the diffusion layer and travels at an angle of α in the waveguide interface and then reflected by the interference filter 102. Light is then reflected back to the surface of the reflective screen at the same angle of α and then projected into incident medium of the reflective screen at an angle of $α_0$ greater than α in accordance with the Snell's law. A visual angle of the reflective screen is thus widened. Adjusting the thickness and refractive index of the cap layer 101 changes divergence of the visual angel of the reflective screen.

Referring again to FIG. 4, the diffusion layer 103 may be formed by patterning the surface of the cap layer 101. The diffusion layer 103 may be an array-arranged pattern or a random pattern. In some embodiments, the diffusion layer 103 is formed by adhering a biconvex lens sheet or bead-shaped material on the cap layer 101. The diffusion layer 103 is used to scatter light.

The absorption layer 104 preferably comprises black or dark color pigments. The absorption layer 104 may alternatively comprise a plurality of black absorption films adhered to the interference filter 102. The absorption layer 104 may be a rigid or flexible material capable of absorbing light. The material of absorption layer 104 can be chosen as desired.

Figure 6:
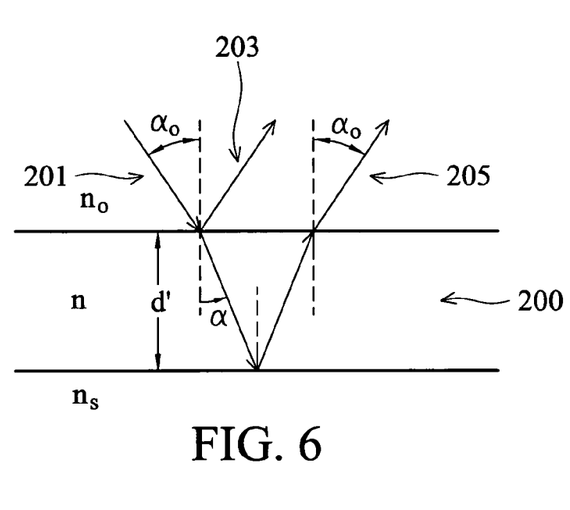
FIG. 6 shows a schematic view showing a phase difference for light reflected at different interfaces.

For the purpose of illustrating the concept of the invention, please refer to FIG. 6. A film 200 with a thickness of "d"' and a refractive index of n is disposed between an incident medium, typically air, with a refractive index of no and a substrate with a refractive index of ns. Light 201 is projected into the film 200 through the incident medium. A portion of the light 203 is reflected by the surface of the film 200. The other portion of light 205 passes through the film 200 and is refracted by the film 200. The light 205 is then reflected by the substrate and back into the incident medium. The phase difference between light 203 and 205 is:

$$\phi = (2\pi/\lambda)2nd \cos α$$

Wherein α is an incident angle of the light, d is thickness, and n is a refractive index of the film 200; π is 180 degrees; λ is a wavelength of the light; and φ is the phase difference. To maintain a constant phase difference at a specific incident angle, the wavelength of light has to increase when an effective refractive index of a film increases. A spectral shift in spectral reflectance is thus reduced.

Figure 7:
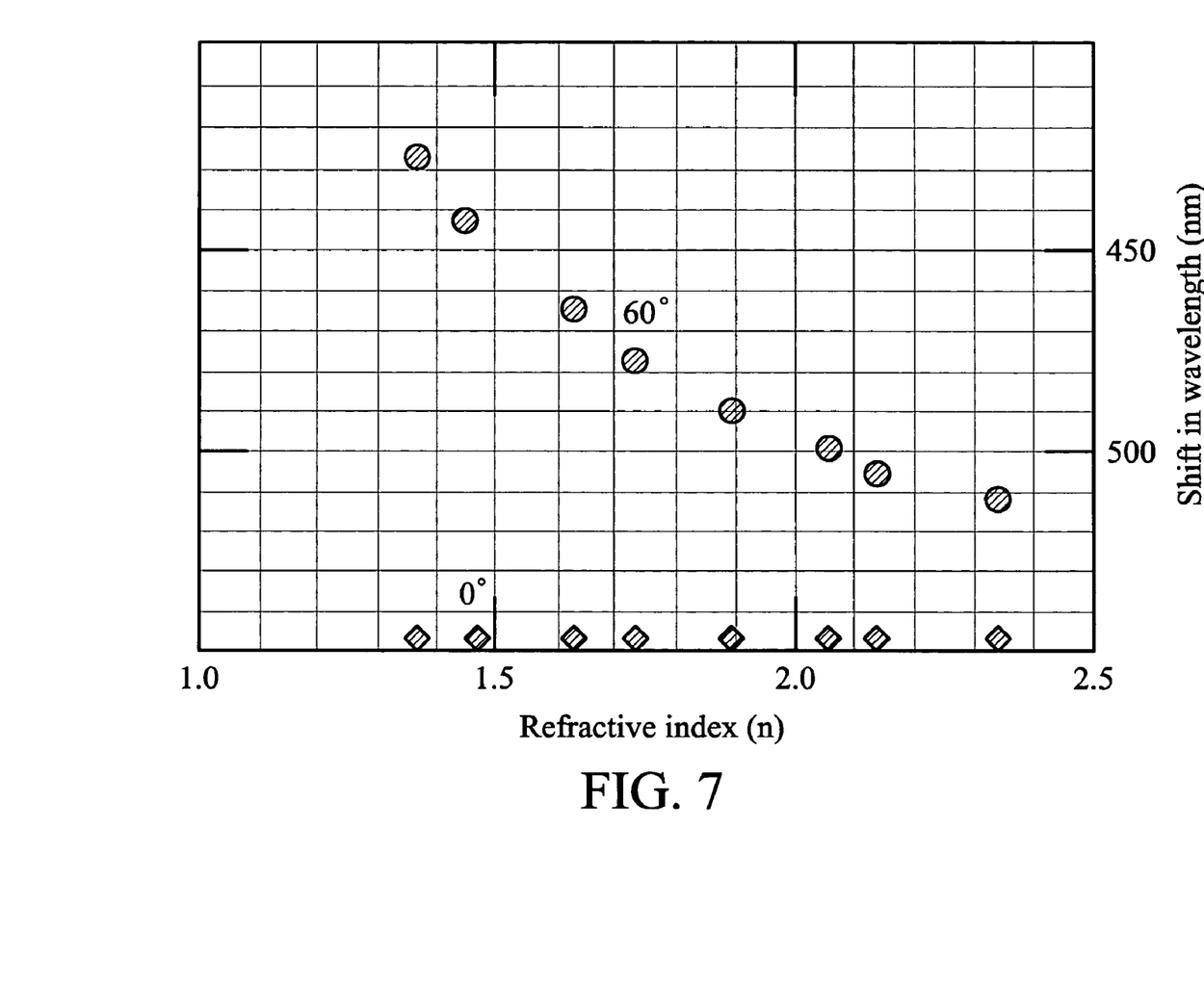
FIG. 7 shows shifts of spectral reflectance of the various optical films when incident angles of light are 0° and 60° respectively according to an embodiment of the invention.
Figure 8A:
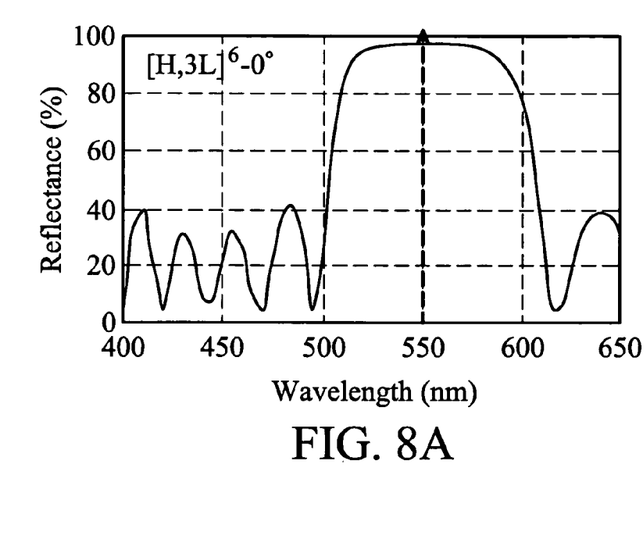
FIGS. 8A to 8D show shifts of spectral reflectance of the optical film with various refractive indexes according to an embodiment of the invention.
Figure 8B:
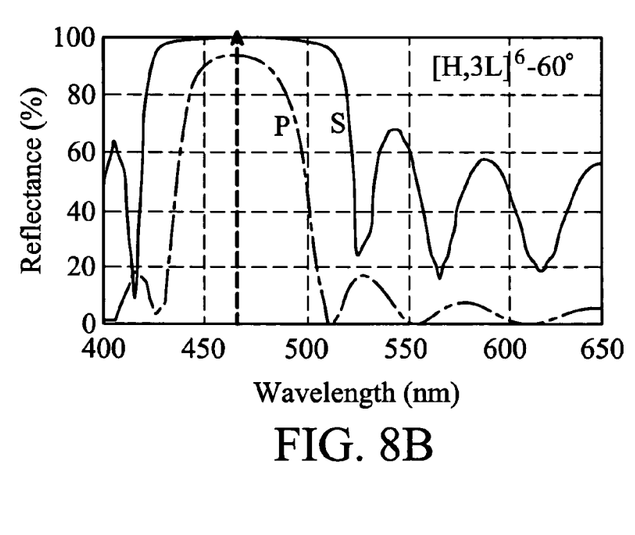
Figure 8C:
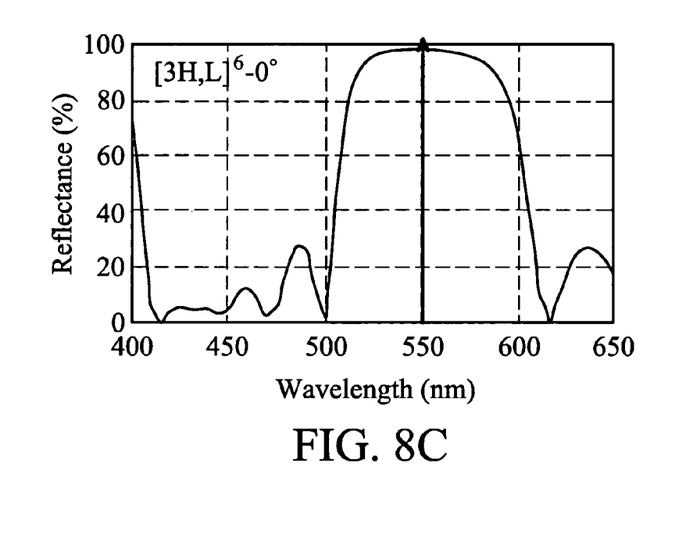
Figure 8D:
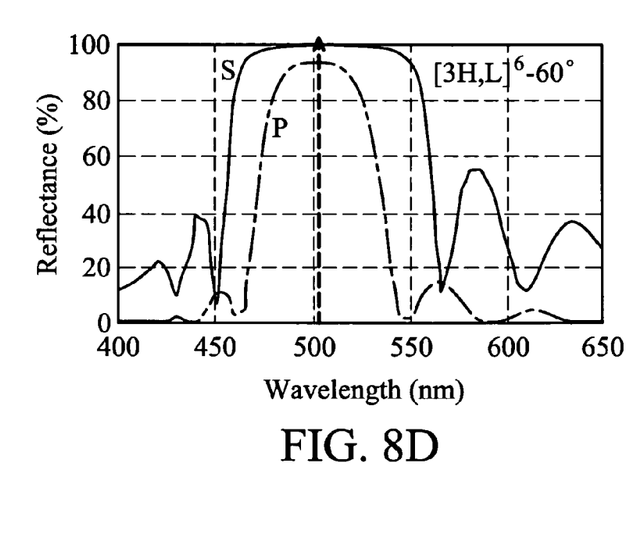

FIG. 7 shows shifts of spectral reflectance of various optical films when the incident angles of light are 0° and 60°. The films have the same optical thicknesses and characteristics of the air/film/glass structure. As the equation shows, a film, such as the interference filter, with a high refractive index causes a reduced spectral shift.

FIGS. 8A to 8D show shifts of spectral reflectance of the optical film with various refractive indexes, wherein the incident angles of light are 0° and 60° respectively. $[H, 3L]^6$ represents stacking a high refractive index layer and a low refractive index layer 6 times to form an alternating stack layer including a total of 12 layers. The high refractive index layer has a thickness of 1 unit and the low refractive index layer has a thickness of 3 units. $[3H, L]^6$ represents stacking a high refractive index layer and a low refractive index layer 6 times to form an alternating stack layer including a total of 12 layers. The high refractive index layer has a thickness of 3 units and the low refractive index layer has a thickness of 1 unit. The 1 unit implies ¼ wave of the reference wavelength, say 550 nm in the present case. As FIG. 8 shows, spectral shifts in the $[3H, L]^6$ are smaller than in $[H, 3L]^6$. Thus, when the thickness of the high refractive index layer is greater than that of the low refractive index layer, the spectral shifts decrease. Preferably, a ratio of the thickness of the high refractive index layers to that of the low refractive index layers is preferably greater than 2.

Residual stress exists in conventional reflective screens due to the several optical films disposed therein and the property of material, such that the stability and durability thereof suffers. The reflective screen of the invention can prevent the adverse effects of residual stress. Since conventional reflective screens are typically made of $SiO_2$ and $Nb_2O_5$ by sputtering process, which causes the residual stress problem. The thickness of the sputtered layer must be carefully controlled to prevent excess residual stress. Preferably, the interference filter 120 comprises alternate layers of $ZrO_2$ and $Al_2O_3$ to reduce the effects of residual stress. In an interface between $ZrO_2$ and $Al_2O_3$, $Al_2O_3$ has effect to stabilize $ZrO_2$. $ZrO_2$ may also be doped with $Y_2O_3$ to eliminate residual stress. The reflective screen of the invention may provide improved flexibility. Reflective screens are typically required to be flexible, so that the screens may be easily rolled up and stored.

Compared with conventional reflective screens, the invention has fewer shifts in spectral reflectance and accommodates a narrower bandwidth in a spectrum at different incident angles, thus, better image contrast may be obtained. Table 1 illustrates the comparison between the reflective screen of the invention and conventional reflective screens.

| Material of interference filter | $Nb_2O_5/SiO_2$ (conventional reflective screen) | Solvent layer (conventional reflective screen) | $ZrO_2/Al_2O_3$ (an embodiment of the invention) |
|---|---|---|---|
| Number of layers (high/low refractive index layers) | 51/50 | 9/9 | 27/26 |
| Refractive index (high/low refractive index layers) | 2.4/1.47 | 1.68/1.41 | 2.01/1.63 |
| Thickness (high/low refractive index layers) (nm) | 1.14/2.16 | 9.2/7.0 | 3.38/1.12 |
| Spectral shift (0°-30°) | | | |
| red (nm) | 28 (634-606) | 32 (640-608) | 22 (630-608) |
| green (nm) | 22 (539-517) | 22 (532-519) | 19 (539-520) |
| blue (nm) | 18 (469-451) | 20 (460-440) | 16 (459-443) |
| Shift of bandwidth (50%) | | | |
| Red, green, blue (nm) | 45, 31, 22 | 15, 10, 7 | 34, 28, 25 |

ADVANTAGES OF THE INVENTION (1) In the reflective screen of the invention, the cap layer can be used as waveguide interface; and by adjusting its thickness and refractive index, it can provide a widened diffusion angle when the interference filter reflects light back to the surface of the reflective screen.

(2) The interference filter is more flexible and easier to roll up and store.

(3) Spectral shifts in reflectance are reduced and a visual angle of the reflective screen is widened while contrast and chroma of the reflective screen is constant.

(4) Image contrast can be improved by using fewer layers to form the interference filter.

(5) The interference filter has less residual stress, thus, the reflective screen is more durable.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is;

1. A reflective screen comprising
a cap layer;
an interference filter formed at one side of the cap layer to reflect light and generate a shift in a spectrum when an incident light is introduced;
a diffusion layer formed at another side of the cap layer; and
an absorption layer formed at one side of the interference filter,
wherein the interference filter comprises alternate layers of a plurality of high refractive index layers and a plurality of low refractive index layers, both of which are alternately stacked, and the high refractive index layers comprise $ZrO_2$ and the low refractive index layers comprise $Al_2O_3$,
wherein the low refractive index layers are doped with $Y_2O_3$.

2. The reflective screen as claimed in claim 1, wherein a number of the high refractive index layers and the low refractive index layers is less than 60.

3. The reflective screen as claimed in claim 2, wherein a number of the high refractive index layers is 23 and a number of the low refractive index layers is 22.

4. The reflective screen as claimed in claim 2, wherein a ratio of a thickness of the high refractive index layers to that of the low refractive index layers is greater than about 2.

5. The reflective screen as claimed in claim 1, wherein the cap layer comprises polyethylene terephthalate, poly carbonate or poly (methyl methacrylate) and a refractive index of the cap layer is greater than about 1.4.

6. The reflective screen as claimed in claim 1, wherein the cap layer comprises polyethylene terephthalate, poly carbonate or poly (methyl methacrylate) and a refractive index of the cap layer is greater than about 1.4.

7. The reflective screen as claimed in claim 1, wherein the diffusion layer is formed by patterning the cap layer.

8. The reflective screen as claimed in claim 7, wherein the diffusion layer comprises an array-arranged pattern or a random pattern.

9. The reflective screen as claimed in claim 1, wherein the diffusion layer comprises dual convex lens or bead-shaped material stuck on the cap layer.

10. The reflective screen as claimed in claim 1, wherein the absorption layer comprises black or dark color pigments.

11. The reflective screen as claimed in claim 1, wherein the absorption layer comprises a plurality of black films stuck on the interference filter.

12. The reflective screen as claimed in claim 1, wherein the absorption layer comprises rigid or flexible material capable of absorbing light.

13. The reflective screen as claimed in claim 1, wherein the reflective screen comprises flexible material.

14. The reflective screen as claimed in claim 1, wherein the interference filter has an average shift in the spectrum of less than about 0.66 nm/degree when an incident angle of the incident light is about 30°.

* * * * *